(12) United States Patent
Ali et al.

(10) Patent No.: US 6,996,798 B2
(45) Date of Patent: Feb. 7, 2006

(54) AUTOMATICALLY DERIVING AN APPLICATION SPECIFICATION FROM A WEB-BASED APPLICATION

(75) Inventors: Syed M. Ali, Sunnyvale, CA (US); Bruce K. Daniels, Capitola, CA (US); Robert N. Goldberg, Emerald Hills, CA (US); Yury Kamen, Foster City, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 559 days.

(21) Appl. No.: 10/157,303

(22) Filed: May 29, 2002

(65) Prior Publication Data

US 2003/0225811 A1    Dec. 4, 2003

(51) Int. Cl.
G06F 9/45         (2006.01)
(52) U.S. Cl. ................................ 717/100; 715/513
(58) Field of Classification Search ............... 717/100, 717/136; 715/513
See application file for complete search history.

(56) References Cited

U.S. PATENT DOCUMENTS

| | | | | |
|---|---|---|---|---|
| 5,185,867 A | * | 2/1993 | Ito ............................. | 717/143 |
| 5,485,601 A | * | 1/1996 | Ching ........................ | 717/106 |
| 5,668,978 A | * | 9/1997 | Yasutake et al. ............. | 703/26 |
| 5,924,109 A | * | 7/1999 | Ackerman et al. .......... | 715/531 |
| 6,055,542 A | * | 4/2000 | Nielsen et al. ........... | 707/104.1 |
| 6,574,644 B2 | * | 6/2003 | Hsu et al. ................. | 715/501.1 |
| 6,665,658 B1 | * | 12/2003 | DaCosta et al. ............... | 707/3 |
| 6,691,106 B1 | * | 2/2004 | Sathyanarayan ............... | 707/3 |
| 6,848,077 B1 | * | 1/2005 | McBrearty ............... | 715/501.1 |
| 2001/0049698 A1 | * | 12/2001 | Hsu et al. ................. | 707/501.1 |
| 2002/0199168 A1 | * | 12/2002 | Namito ....................... | 717/107 |
| 2003/0200531 A1 | * | 10/2003 | Fairweather ............... | 717/114 |

OTHER PUBLICATIONS

Clinton Wong; "HTTP Pocket Reference", 1st Edition May 2000, O'reilly Online Catalog, www.oreilly.com/catalog/httppt/chapter/http_pkt.html, 7 pages.

Thom Blum, et al.; "Writing a Web Crawler in the Java Programming Language", Java Developer Connection, Jan. 1998, http://developer.java.sun.com/developer/technicalArticles/ThirdParty/WebCrawler/, 6 pages.

"Monitoring Transactions", Forte for Java (Internet Edition) Reviewer's Guide, Aug. 2001, 2 pages.

* cited by examiner

*Primary Examiner*—John Chavis
(74) *Attorney, Agent, or Firm*—Osha Liang LLP (57) ABSTRACT

A method for deriving an application specification from an enterprise application including mapping the enterprise application to obtain a plurality of states and a plurality of transitions, monitoring the enterprise application to obtain a list of variable usages for each of the plurality of states, parsing source code of the enterprise application to obtain process logic for each of the plurality of transitions, and deriving the application specification using each of the plurality of states, the plurality of transitions, the list of variable usages for each of the plurality of states, and the process logic for each of a plurality of transitions.

30 Claims, 3 Drawing Sheets

AUTOMATICALLY DERIVING AN APPLICATION SPECIFICATION FROM A WEB-BASED APPLICATION

BACKGROUND OF INVENTION

Modern enterprise applications are typically implemented as multi-tier systems. Multi-tier systems serve the end-user by distributing the functionality of the enterprise application across multiple tiers. In general, the enterprise application functionality is distributed across a user interface at the front end, an application server, and a database management system (DBMS) at the backend. Depending on the component providing the user interface, an additional tier may exist between the user interface and the application tier. For example, if the user interface is a web browser, then a web server is usually interposed between the user interface and the application server. The web browser sends requests to the web server, and the web server interacts with the application server to obtain data from the database via the DBMS. The web server uses the data obtained from the database to generate a response to send to the web browser.

Figure 1:
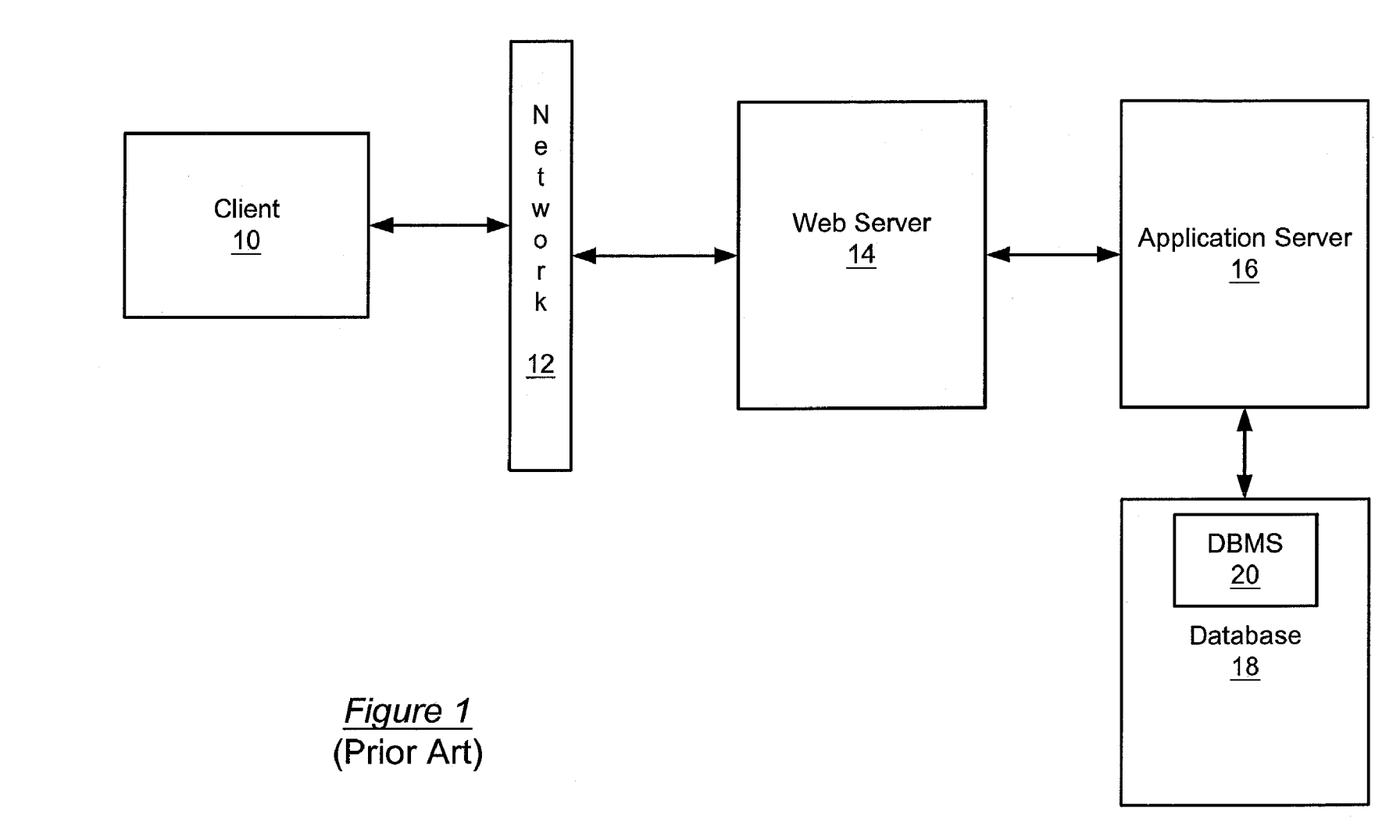
FIG. 1 illustrates a conventional computer system running an enterprise application.

FIG. 1 illustrates a conventional computer system running an enterprise application. The enterprise application is typically viewed by a client (10) as a series of web pages. The enterprise application is distributed across a web server (14), an application server (16), and a database (18). A DBMS (20) provides an interface between the database (18) and the application server (16). The web server (14) is a program that, using the client/server model and Hypertext Transfer Protocol (HTTP), serves the files that form web pages to the client. An Apache web server, designed and distributed by the Apache Software Foundation, is an example of a web server.

Returning to FIG. 1, the application server (16) provides the business logic for the web based application. The iPlanet™ Application server, designed and distributed by Sun Microsystems, California USA, is an example of an application server. (iPlanet is a registered trademark of Sun Microsystems, California, USA). As described above, the application server (16) interacts with the database (18) via the DBMS (20). The DBMS (20) allows one or more processes to create and access data in a database. The DBMS (20) manages requests allowing the various processes accessing the database (18) to be free from having to understand where the data is physically located on storage media and, in a multi-user system, who else may also be accessing the data. In handling requests, the DBMS (20) ensures the integrity and security of the data.

The client (10) may be any process that is capable of accessing the web server (14) via a network (12). Typically, the client (10) includes functionality to send and receive HTTP requests (e.g., a web browser), and to interpret Hypertext Mark-up Language (HTML) documents. Additionally, the client (10) may include functionality to process Common Gateway Interface (CGI) script (e.g., a CGI engine), as well as other pieces of code embedded in HTML documents (e.g., Java™ embedded in Java™ Server Pages). The network (12) may be a local area network (LAN), a wide area network (WAN) as an Internet, etc. Typically, the client (10) sends a request to the web server (14), which in turn forwards the request to the application server (16). The application server (16) generally processes the request, and if required, stores or retrieves information from the database (18) via the DBMS (20).

As enterprise applications continue to grow, they have the potential to become unmanageable over time. This is usually due to enterprise application customizations, implementation work-arounds, and quick fixes during the various life-cycles of the software development. These modifications generally increase the complexity of the enterprise application, specifically, the complexity of the business process model. In these situations, the business process model of the enterprise application becomes more difficult to understand. Further, in many situations, without a complete understanding of the business process model, any modifications to the enterprise application may be difficult to implement correctly.

SUMMARY OF INVENTION

In general, in one aspect, the invention relates to a method for deriving an application specification from an enterprise application comprising mapping the enterprise application to obtain a plurality of states and a plurality of transitions, monitoring the enterprise application to obtain a list of variable usages for each of the plurality of states, parsing source code of the enterprise application to obtain process logic for each of the plurality of transitions, and deriving the application specification using each of the plurality of states, the plurality of transitions, the list of variable usages for each of the plurality of states, and the process logic for each of a plurality of transitions.

In general, in one the invention relates to a method for deriving an application specification from an enterprise application comprising mapping the enterprise application to obtain a plurality of states and a plurality of transitions, monitoring the enterprise application to obtain a list of variable usages for each of the plurality of states, parsing source code of the enterprise application to obtain process logic for each of the plurality of transitions, analyzing the source code of the enterprise application to derive each of a plurality of business objects, and deriving the application specification using each of the plurality of states and the plurality of transitions, the list of variable usages for each of the plurality of states, the process logic for each of a plurality of transitions, and each of the plurality of business objects.

In general, in one aspect, the invention relates to a network system, having a client and a server running an enterprise application comprising an interaction monitor interposed between the client and the enterprise application, and a code analyzer operatively connected to the server, wherein the interaction monitor maps the enterprise application to obtain a plurality of states and a plurality of transitions and monitors the enterprise application to obtain a list of variable usages for each of the plurality of states, and the code analyzer parses and analyzes source code of the enterprise application to obtain process logic for each of the plurality of transitions.

In general, in one aspect the invention relates to a network system, having a client and a server running an enterprise application comprising a web crawler operatively connected to the server, and a code analyzer operatively connected to the server, wherein the web crawler maps the enterprise application to obtain a plurality of states and a plurality of transitions, and the code analyzer parses and analyzes source code of the enterprise application to obtain a list of variable usages and process logic for each of the plurality of transitions.

In general, in one aspect, the invention relates to an apparatus for deriving an application specification from an enterprise application comprising means for mapping the enterprise application to obtain a plurality of states and a plurality of transitions, means for monitoring the enterprise application to obtain a list of variable usages for each of the plurality of states, means for parsing source code of the enterprise application to obtain process logic for each of the plurality of transitions, and means for deriving the application specification using each of the plurality of states, the plurality of transitions, the list of variable usages for each of the plurality of states, and the process logic for each of a plurality of transitions.

Other aspects and advantages of the invention will be apparent from the following description and the appended claims.

DETAILED DESCRIPTION

Exemplary embodiments of the invention will be described with reference to the accompanying drawings. Like items in the drawings are denoted by the same reference numbers throughout several figures for consistency.

In the following detailed description of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

The invention relates to a method for deriving an application specification from an enterprise application. An application specification includes two distinct components: an application usage specification, and a business object specification.

The business object specification (BOS) defines the characteristics of all business objects to be used in the enterprise application. These characteristics may include, but are not limited to, attributes, attribute constraints, persistence information, triggers, relationships, business object methods, etc. For example, the BOS may define a trigger for a particular business object such that when a specific event occurs, such as an update to a data field in a database, a set of Structured Query Language (SQL) statements is "fired-off" to perform an integrity check on the database. Additionally, in accordance with one embodiment of the invention, the business object methods define enterprise application and process logic. Further, the BOS defines the relationships between the various business objects.

The application usage specification (AUS) defines how the business objects, as defined by the BOS, are to be used within the enterprise application. In one or more embodiments of the invention, the AUS is defined as a series of states and transitions. A state defines an interaction with a client (i.e., a user, another enterprise application, a web service, etc.). The interaction may include, but is not limited to, a user gesture (e.g., a button click, voice commands, etc.), an interaction from another enterprise application (e.g., via a web service using Simple Object Access Protocol (SOAP)), etc. Those skilled in the art will appreciate that an interaction may take on other forms in an accessible environment.

Additionally, the AUS contains variable interaction qualifiers. The interaction qualifiers define constraints on variable usage and display within the application. For example, some variables within the application are designated as HTML text which may not be modified, while other variables may be designated as containing text that may be modified.

Figure 2:
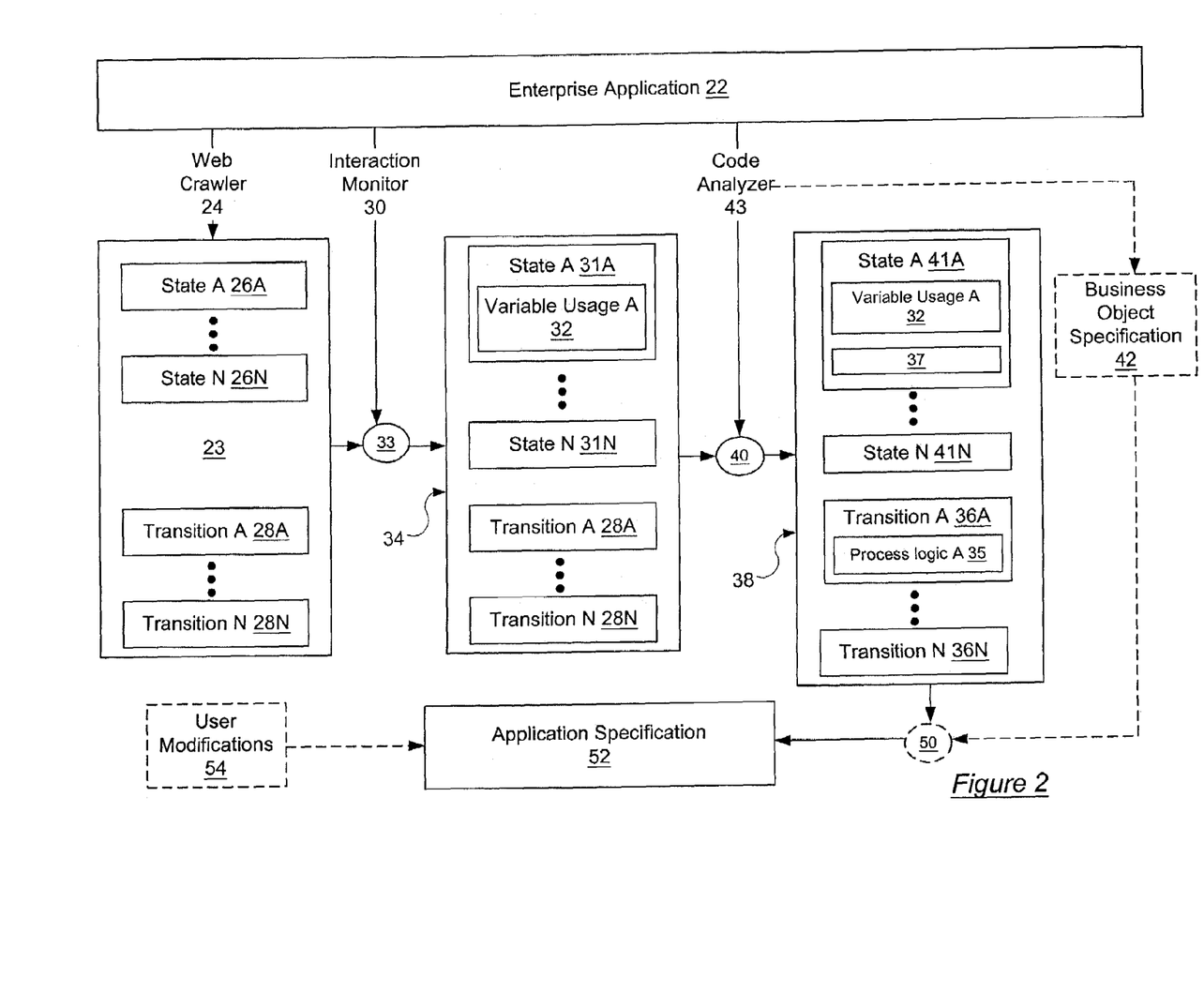
FIG. 2 illustrates a flow diagram for deriving an application specification in accordance with one embodiment of the invention.

FIG. 2 illustrates a flow diagram for deriving an application specification from an enterprise application in accordance with one embodiment of the invention. Information about an enterprise application (22), specifically information about states (26A, 26N) and transitions (28A, 28N), is initially obtained using a web crawler (24). The web crawler (24) automates the process of following links between web pages. In one embodiment of the invention, the web crawler (24) starts parsing a first web page in the enterprise application (22), noting any hypertext links and/or buttons on the first web page that take the client (not shown) to a subsequent web page within the enterprise application. The web crawler (24) then repeats the same process for the subsequent web pages in the enterprise application. In this manner, the web crawler (24) is able to recursively map the entire enterprise application (22). The result of the mapping is to generate an outline of an AUS (23).

In one embodiment of the invention, the web crawler (24) may use the header for each web page encountered to generate the list of states (26A, 26N), and track the hyperlinks and/or buttons used to reach a web page to generate the list of transitions (28A, 28N). In another embodiment of the invention, the web crawler (24) uses a Universal Resource Locator (URL) corresponding to each web page encountered to denote the state, i.e., each URL translates into a state.

In one embodiment of the invention, the web crawler (24) resides on a single computer (not shown) and sends HTTP requests for web pages within the enterprise application (22).

Returning to FIG. 2, after obtaining an outline of the AUS (23), (specifically, the list of states (26A, 26N) and transitions (28A, 28N)), and an interaction monitor (30) is used to obtain additional information about each of the states in the list of states (26A, 26N). The additional information includes, but is not limited to, interaction qualifiers, variable usages, etc. In one embodiment of the invention, the interaction monitor (30) is a proxy (not shown), i.e., a process used to intercept network traffic interposed between a client (not shown) and the enterprise application (22). Specifically, the proxy forwards all requests from the client to the enterprise application (22), and similarly re-directs all responses from the enterprise application (22) back to the client. Typically, the client is not aware that the proxy exists.

In one embodiment of the invention, the proxy is located on the same web server that is providing an interface to the client. In one embodiment of the invention, the proxy is located on a server that is not in the set of servers running the enterprise application (22). An example of a proxy is the Forte™ HTTP Transaction Monitor. (Forte is a trademark of Sun Microsystems, California, USA).

The interaction monitor (30) monitors and analyzes all the network traffic i.e., requests and responses, between the client and the enterprise application (22). In one embodiment of the invention, for each URL visited by the client, the interaction monitor (30) maps the URL to a state, and each button clicked to a transition. Further, by analyzing the HTTP requests and responses, a list of variable usages for each state (32) may be derived. For example, the following is a code sample of an HTML form:

Code Sample 1: HTML Form

```
<html>
<body>
<form method="POST" action= "http://
  www.john_doe_site.com/confirm">
 .
 .
 .
 <p>
   First Name <input type="text" name="firstName"
   size="27" value="John">
 </p>
 <p>
   <input type="hidden" name="clientid"
   value="abcdefg123">
 </p>
 .
 .
 .
</form>
</body>
</html>
```

Referring to Code Sample 1, a post request issued by the client (lines 3 and 4) using the above HTML code provides the interaction monitor (30) with one writeable variable usage, "firstName" on line 9, and a non-writeable variable usage, "clientid" on line 13. The variable usages (writeable and non-writeable) would be associated with a URL that corresponds to a state.

Once information has been obtained for states in the list of states (26A, 26N), the information is combined with the outline of the AUS (23) to produce a partial AUS (34) via a first integration process (33). The partial AUS (34) contains each state along with all variable usages (32) associated with that state, as obtained from the interaction monitor (30). Those skilled in the art will appreciate that depending on the complexity of the enterprise application (22), the interaction monitor may take an indeterminate amount of time to obtain all the variable usages (32) for each state in the list of states (26A, 26N). To decrease the time required to obtain the variable usages (32), multiple interaction monitors may be used.

In one embodiment of the invention, the integration process of combining the outline of the AUS (23) and the information obtained from the interaction monitor (30) to obtain the partial AUS (34) is performed by a script that uses the URL information to group together the variable usages (32) for each state in the list of states (26A, 26N). For example, each state is associated with a URL, and each of the variable usages, both writeable and non-writeable, are also associated with URL tags. The integration process (33) uses the URL tag associated with each variable usage, and groups the variable usage with the state having the corresponding URL. Those skilled in the art will appreciate that each state and the variable usages may use any type of identification scheme that allows the variable usages to be associated with the corresponding state.

In one embodiment of the invention, once the partial AUS (34) has been generated, information regarding process logic (35), and a BOS (42) are obtained using a code analyzer (43). The code analyzer (43) parses and analyzes the source code of the enterprise application (22). As the enterprise application (22) is a web-based application, the source is typically in the form of server script (e.g., CGI, Perl script, Java™ Script, etc.) or embedded code such as Java™ Server Pages (JSP) with JavaBeans™ running on an application server, Active Server Pages, etc. Those skilled in the art will appreciate that the completeness of the BOS is dependent on the tools and methods available for code analysis.

The code analyzer (43) parses the source code of the enterprise application (22) to obtain information about how the web pages in the enterprise application (22) are laid out (i.e., how the content is displayed to the client). Using the information obtained from the layout, the code analyzer (34) can generate a business object specification. In one embodiment of the invention, Java™ Introspection Application Programming Interface (API) is used to analyze the source code of the web-based application (i.e., JavaBeans™). In another embodiment of the invention, a byte code analyzer is used to statically analyze the byte code from class files. Further, the code analyzer (43) can parse the server script or embedded code, or references to embedded code to obtain information about the process logic (35) associated with a given transition (36A, 36N).

For example, if a given enterprise application (22) is written in JSP, then the code analyzer (43) can use the JSP form clause to identify a handler servlet when a form is posted to a web server (not shown) running the enterprise application (22). Using the identity of the handler servlet, the code analyzer (43) can then extract state initialization information (37) and process logic (35) from servlet classes and helper classes, associated with the handler servlet. The state initialization information (37) includes, but is not limited to, information necessary to initialize the state such as setting particular variables to default values, etc. The helper class is typically used by the JavaBeans™ to hold an intermediate state of the JavaBeans™ when the JavaBeans™ are passed in with a request from a client.

JSP runtime engines, i.e., a process running on a web server used to process JSP pages, provide a mechanism to automatically copy parameter values from a servlet request into properties of the helper class. This information may be obtained by the code analyzer (43) and used to derive state initialization information (37). The servlet classes contain the Java™ code, i.e., process logic (35) that may be used to process the information submitted in the form post request.

In one embodiment of the invention, the code analyzer is located on a computer operatively connected to computer system running the enterprise application (i.e., the web server, the database, etc.). Further, the code analyzer process has access to all source code associated with the enterprise application. The associated source code, includes but is not limited to, server script, DBMS script, database queries, script used to interface legacy applications, etc.

The information obtained and/or derived by the code analyzer (43) uses a mapping scheme, as described above, to denote associations with various states and transitions. The information obtained from the code analyzer (43) is combined with the partial AUS (34) to produce a complete AUS (38) using a second integration process (40). The second integration process (40) uses the mapping scheme of the code analyzer (43) to associate the process logic (35) with the corresponding transition (36A, 36N). Further, the second integration process (40) also uses the mapping scheme to integrate the state initialization information (37) with the corresponding states (41A, 41N).

The BOS (42) and the complete AUS (38) are combined to produce the application specification (52). In one embodiment of the invention, the complete AUS (38) and the BOS (42) are maintained in two separate files. In another embodiment of the invention, the complete AUS (38) and BOS (42) are combined into one file. A process (50) to combine the BOS (42) and the complete AUS (38) may include converting the complete AUS (38) and BOS (42) into a file format such as HTML, Extensible Markup Language (XML), etc.

Those skilled in the art will appreciate that while each of information gathering technologies, i.e., web crawler (24), interaction monitor (30), and code analyzer (43), are described as obtaining only specification information, the information obtained from each of the information gathering technologies may vary or overlap. For example, the web crawler may obtain all the state and transition information for only the static links in the enterprise application and the interaction monitor may be required to obtain information about the dynamic links. Further, the interaction monitor may only obtain limited information about the variable usages, and thus the code analyzer may be used to obtain the additional details of the variable usages that could not be obtained by the interaction monitor.

Further, those skilled in art will appreciate that the terms used to described the AUS, i.e., outline of the AUS, partial AUS, and complete AUS, are meant to describe the relative completeness of the AUS and should only be used as a general guideline rather than an absolute measure. In some cases, depending on the architecture of the enterprise application, the web crawler and the interaction monitor may be able to obtain a relatively complete AUS, while in other cases, the web crawler and the interaction monitor may only be able to extract an outline of the AUS and require the code analyzer to extract the remainder of the information.

Returning to FIG. 2, in one embodiment of the invention, a user may make modifications to the application specification (52). A user modification (54) may include, but is not limited to, adding additional variable usages to the application specification, modifying the process logic (35) for various transitions, etc.

In one embodiment of the invention, an Integrated Development Environment (IDE) is used to make the user modifications (54). In one embodiment of the invention, a text editor is used to make the user modifications (54).

Figure 3:
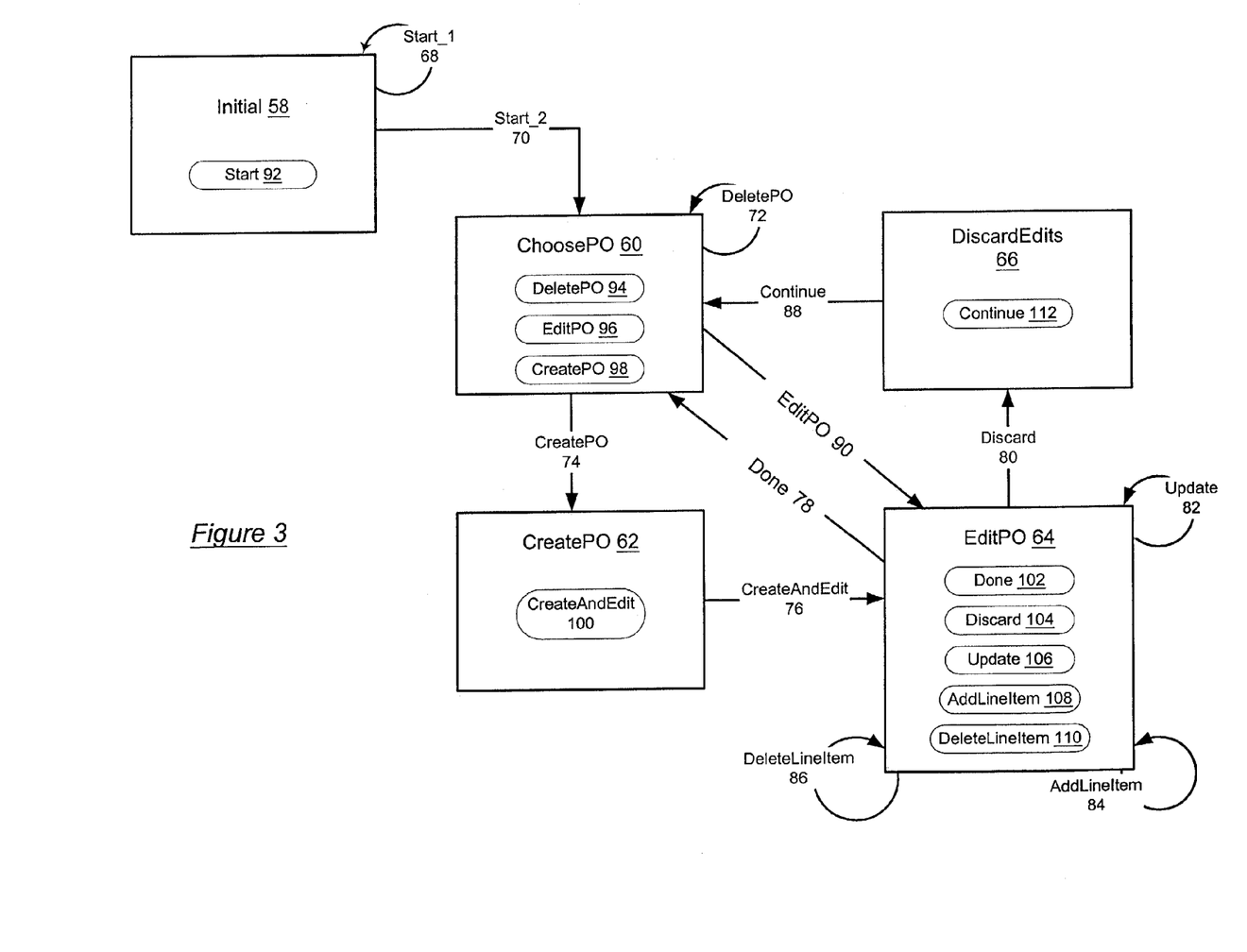
FIG. 3 illustrates an enterprise application in accordance with one embodiment of the invention.

FIG. 3 illustrates an enterprise application in accordance with one embodiment of the invention. The enterprise application includes five web pages (Initial (58), ChoosePO (60), CreatePO (62), EditPO (64), and DiscardEdits (66)). Further, each web page (58, 60, 62, 64, 66) is connected to at least one other web page (58, 60, 62, 64, 66) by a link (68, 70, 72, 74, 76, 78, 80, 82, 84, 86, 88, 90). Initially, a web crawler, in accordance with one embodiment of the invention, maps the enterprise application. The following code sample illustrates information that the web crawler may extract from the enterprise application:

Code Sample 2: Information by Web Crawler

```
state initial( )
{
    transition Start { }
} // state initial
state ChoosePO( )
{
    transition CreatePO { }
    transition DeletePO { }
    transition EditPO { }
} // state ChoosePO
state CreatePO( )
{
    transition CreateAndEditPO { }
} // state CreatePO
state EditPO( )
```

-continued

```
{
    transition Update { }
    transition AddLineItem { }
    transition DeleteLineItem { }
    transition Done { }
    transition Discard { }
} // state EditPO
state DiscardEdits( )
{
    transition Continue { }
} // state DiscardEdits
```

Referring to Code Sample 2, the web crawler extracted each of the web pages within the enterprise application and each of the links. Each of the web pages was mapped to a state, and each of the links was mapped to a transition. Further, the transitions were grouped with the state from which the transition is initiated. For example, in line 1, state initial corresponds to web page Initial (58 in FIG. 3).

Further, the Start transition (68, 70) corresponds to a start link (92). Note that in this particular case, the Start transition (68, 70) is a conditional transition. The conditional transition uses data submitted with the request to follow a particular link and determine which web page is sent to the client. An example of a conditional transition is a web page that requests a password. If the password is correct, then the enterprise application sends the client the next page in the enterprise application. If the password is incorrect, then the enterprise application sends the client back to the password page to enter a correct password.

Returning to Code Sample 2, a ChoosePO state defined in lines 7–12 corresponds to the ChoosePO web page (60), and transitions (72, 74, 90) correspond to a DeletePO link (94), a CreatePO link (98), and an EditPO link (96), respectively. Similarly, a CreatePO state defined in lines 14–17 corresponds to the CreatePO web page (62), and transition (76) corresponds to a CreateAndEdit link (100). An EditPO state defined in lines 19–26 corresponds to the EditPO web page (64), and transitions (78, 80, 82, 84, 86) correspond to a Done link (102), a Discard link (104), an Update link (106), an AddLineItem link (108), and a DeleteLineItem link (110), respectively. Finally, a DiscardEdits state defined in lines 28–31 corresponds to the DiscardEdits web page (66), and transition (88) corresponds to a Continue link (112).

Those skilled in the art will appreciate that the organization of the data obtained by the web crawler may be different than that illustrated in FIG. 2 or shown in Code Sample 2, without departing from the scope of the invention.

Once the initial information is obtained by the web crawler, an interaction monitor, as described above, is used to obtain information about variable usages. The following code sample illustrates information that may be obtained by the interaction monitor (indicated in bold typeface) for the exemplary enterprise application illustrated in FIG. 3 and described in code Code sample Sample 2:

Code Sample 3: Information Extracted by Interaction Monitor

```
state initial ( )
{ customerName: RW
    transition Start {
}
```

-continued

```
      } // state initial
      state ChoosePO( )
      {[purchaseOrders(0,n)]: R {
              orderId "Order ID"}
         transition CreatePO { }
         transition DeletePO { }
         transition EditPO { }
      } // state ChoosePO
      state CreatePO( )
      {
      transition CreateAndEditPO { }
      } // state CreatePO
      state EditPO(PurchaseOrder po)
      { po: RW {
              orderId "Order ID": R ,
              orderDate "Date",
              shipToName "Ship To",
              shipToPhone "Phone",
              shipToAddress1 "Address",
              shipToAddress2 "Address2",
              shipToCity "City",
              shipToState "State",
              shipToZip "Zip Code",
              shipToCountry "Country",
              billToName "Bill To",
              billToPhone "Phone",
              billToAddress1 "Address",
              billToAddress2 "Address2",
              billToCity "City",
              billToState "State",
              billToZip "Zip Code",
              billToCountry "Country",
              [lineItems(0,n)] "Line Items" {
                 orderLine "Item",
                 productId "Product ID",
                 productName "Product",
                 productDescription "Description",
                 unitPrice "Unit Price",
                 quantity "Quantity" }
           }
           transition Update { }
           transition AddLineItem { }
           transition DeleteLineItem { }
           transition Done { }
           transition Discard { }
      } // state EditPO
      state DiscardEdits ( )
      { message: R ;
           transition Continue { }
      } // state DiscardEdits
```

Referring to Code Sample 3, the interaction monitor extracts information about the variable usages for each of the states in the enterprise application. For example, the state initial defined in lines 1–6 includes one variable usage "customerName," which is denoted as having read and write permissions. Those skilled in the art will appreciate that Code Sample 3 only illustrates one of many potential schemes for denoting variable usages. Other schemes may be used that are more or less detailed than the scheme illustrated in Code Sample 3 without departing from the scope of the invention.

Returning to code sample 3, State ChoosePO is defined by lines 9–16 with a variable usage defined for a purchase order object. Further, in this particular example, the enterprise application may have multiple purchaseOrder objects as indicated by the range (0, n) with each purchaseOrder object identified by an "OrderId." Similarly, the EditPO state defined in lines 23–57 has a purchaseOrder object defined in lines 24–50. In particular, the purchaseOrder object is further defined to include lineItem objects as defined in lines 43–49. Finally, the DiscardEdits state is defined in lines 59–62 as having one variable usage "message." The CreatePO state defined in lines 18–21 has no variable usages.

After the information obtained by the interaction monitor is integrated into the application usage specification, as illustrated in Code Sample 3, a code analyzer, as described above, is used to obtain information about process logic involved in the transitions and information about the business objects. The following code sample illustrates information that may be obtained by the code analyzer (designated in bold typeface) for the exemplary enterprise application illustrated in FIG. 3 and described in Code Sample 3:

Code Sample 4: Information Extracted by Code Analyzer

```
state initial {
      {       customerName = "";
      }
      customerName: C ;
      transition Start {
          switch (customerName) {
          case "": return new initial( );
          default: return new ChoosePO( );
          }
      }
}
state ChoosePO( )
{
      {       purchaseOrders =
factory(POApplication.PurchaseOrder).myOrders(customerName);
      }
      [purchaseOrders(0,n)): R {
          orderId "Order ID"
      }
      transition CreatePO {
          return new CreatePO( );
      }
      transition DeletePO {
          PurchaseOrder po = purchaseOrders.getSelectedOne( );
          factory(POApplication.PurchaseOrder).remove(po);
          return new ChoosePO( );
      }
      transition EditPO {
          PurchaseOrder po = purchaseOrders.getSelectedOne( );
          return new EditPO(po);
      }
}
state CreatePO( )
{
transition CreateAndEditPO {
PurchaseOrderPK pk =
          factory(POApplication.PurchaseOrder).assignNextPK( );
      PurchaseOrder po =
          factory(POApplication.PurchaseOrder).create(pk);
      po.setBillToName(customerName);
      return new EditPO(po);
      }
}
state EditPO( PurchaseOrder po)
{
      po:    RW {
             orderId "Order ID": R ,
             orderDate "Date",
             shipToName "Ship To",
             shipToPhone "Phone",
             shipToAddress1 "Address",
             shipToAddress2 "Address2",
             shipToCity "City",
             shipToState "State",
             shipToZip "Zip Code",
             shipToCountry "Country",
             billToName "Bill To",
             billToPhone "Phone",
             billToAddress1 "Address",
```

-continued

```
        billToAddress2 "Address2",
        billToCity "City",
        billToState "State",
        billToZip "Zip Code",
        billToCountry "Country",
        [lineItems(0,n)] "Line Items" {
            orderLine "Item",
            productId "Product ID",
            productName "Product",
            productDescription "Description",
            unitPrice "Unit Price",
            quantity "Quantity"
        }
    }
    transition Update {
        return new EditPO(po);
    }
    transition AddLineItem {
        LineItemPK pk =
        factory(POApplication.LineItem).assignNextPK(po);
        LineItem li = factory(POApplication.LineItem).create(pk);
        return new EditPO(po);
    }
    transition DeleteLineItem {
        LineItem li = po.lineItems.getSelectedOne( );
        factory(POApplication.LineItem).remove(li);
        return new EditPO(po);
    }
    transition Done {
        return new ChoosePO( ),
    }
    transition Discard {
        return new DiscardEdits( );
    }
}
state DiscardEdits( )
{
    message:       R ;
    transition Continue {
        return new ChoosePO( );
    }
}
```

Referring to Code Sample 4, the code analyzer extracts information about the process logic associated with each of the transitions. For example, the start transition, defined in lines 9–12, uses the "customerName" to determine which state to transition to, i.e., follow the Start_1 transition (68 in FIG. 3) back to the Initial web page (58 in FIG. 3) or follow the Start_2 transition (70 in FIG. 3) to the ChoosePO web page (60 in FIG. 3). Similarly, lines 16–39 define the ChoosePO state with detailed process logic for each of the listed transitions. Further, lines 44–47 define the process logic for the CreateAndEdit transition, line 83 defines the process logic for the Update transition, lines 87–89 define the process logic for the AddLineItem transition, lines 93–95 define the process logic for the DeleteLineItem transition, line 99 defines the process logic for the Done transition, line 103 defines the process logic for the Discard transition, and line 113 defines the process logic for the Continue transition.

Code Sample 4 defines a complete AUS in accordance with one embodiment of the invention. In addition to the AUS, the application specification also includes a BOS. The BOS is obtained, in one embodiment of the invention, by the code analyzer, as described above. The following code sample illustrates the BOS for the exemplary enterprise application illustrated in FIG. 3 and described in Code Sample 4:

Code Sample 5: Business Object Specification

```
persistent class PurchaseOrder {
    persistent Long orderId;
    persistent Date orderDate = new Date(0);
    persistent String shipToName;
    persistent String shipToPhone;
    persistent String shipToAddress1;
    persistent String shipToAddress2;
    persistent String shipToCity;
    persistent String shipToState;
    persistent String shipToZip;
    persistent String shipToCountry = "USA";
    persistent String billToName;
    persistent String billToPhone;
    persistent String billToAddress1;
    persistent String billToAddress2;
    persistent String billToCity;
    persistent String billToState;
    persistent String billToZip;
    persistent String billToCountry = "USA";
    owns (0,n,1,1) LineItem lineItems orderId;
} // class PurchaseOrder
persistent class LineItem {
    persistent Long orderLine;
    persistent String productId;
    persistent String productName;
    persistent String productDescription;
    persistent Decimal unitPrice;
    persistent Long quantity;
} // class LineItem
```

In Code Sample 5, lines 1–23 define a PurchaseOrder business object. Specifically, within the PurchaseOrder business object, lines 2–19 define attributes of the PurchaseOrder business object. Line 21 defines a relationship between the PurchaseOrder business object and a LineItem business object; in particular, the PurchaseOrder business object "owns" the LineItem business object. Lines 25–34 define the LineItem business object.

Embodiments of the invention may include one or more of the following advantages. The invention provides an automated means of extracting the business logic, in the form of an application specification, from an existing enterprise application. The application specification and the business object specification allow the enterprise application to be easily modified and updated. Further, by extracting an AUS and BOS an enterprise application may be generated using an enterprise application generator. Also the platform independent nature of the AUS and BOS allow the enterprise application to be easily migrated between various platforms and between multiple tiered environments While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for deriving an application specification from an enterprise application comprising:
    obtaining information about a plurality of states and a plurality of transitions in the enterprise application;
    monitoring the enterprise application to obtain a list of variables for each of the plurality of states;
    parsing source code of the enterprise application to obtain process logic for each of the plurality of transitions; and
    deriving the application specification using each of the plurality of states, the plurality of transitions, the list of variables for each of the plurality of states, and the process logic for each of a plurality of transitions.

2. The method of claim 1, further comprising:
analyzing the source code of the enterprise application to derive each of a plurality of business objects.

3. The method of claim 2, analyzing the source code is performed by a code analyzer.

4. The method of claim 1, wherein obtaining information about the plurality of states and the plurality of transitions is performed by a web-crawler.

5. The method of claim 1, wherein monitoring the enterprise application is performed by an interaction monitor.

6. The method of claim 5, wherein the interaction monitor is a proxy.

7. The method of claim 5, wherein the interaction monitor is a hypertext transfer protocol transaction monitor.

8. The method of claim 1, wherein monitoring the enterprise application is performed by a plurality of interaction monitors.

9. The method of claim 1, wherein parsing the source code is performed by a code analyzer.

10. The method of claim 1, the application specification comprising an application usage specification and a business object specification.

11. The method of claim 10, the application usage specification comprising the plurality of states and the plurality of transitions.

12. The method of claim 10, the application usage specification comprising grouping each of the plurality of transitions with a corresponding state in the plurality of states.

13. The method of claim 12, further comprising:
determining the corresponding state using a mapping scheme.

14. The method of claim 13, wherein the mapping scheme uses a universal resource locator to identify each of the plurality of states and each of the plurality of transitions.

15. A method for deriving an application specification from an enterprise application comprising:
obtaining information about a plurality of states and a plurality of transitions in the enterprise application;
monitoring the enterprise application to obtain a list of variables for each of the plurality of states;
parsing source code of the enterprise application to obtain process logic for each of the plurality of transitions;
analyzing the source code of the enterprise application to derive each of a plurality of business objects; and
deriving the application specification using each of the plurality of states and the plurality of transitions, the list of variables for each of the plurality of states, the process logic for each of a plurality of transitions, and each of the plurality of business objects.

16. A network system, having a client and a server running an enterprise application comprising:
an interaction monitor interposed between the client and the enterprise application; and
a code analyzer operatively connected to the server,
wherein the interaction monitor obtains information about a plurality of states and a plurality of transitions in the enterprise application and monitors the enterprise application to obtain a list of variables for each of the plurality of states, and the code analyzer parses and analyzes source code of the enterprise application to obtain process logic for each of the plurality of transitions.

17. The network system of claim 16, further comprising:
an integration means for combining each of the plurality of states, the plurality of transitions, the list of variables for each of the plurality of states, the process logic for each of a plurality of transitions to produce an application specification.

18. The network system of claim 17, wherein the integration means formats the application specification into an extensible mark-up language compliant file.

19. The network system of claim 17, the application specification comprising grouping each of the plurality of transitions with a corresponding state in the plurality of states.

20. The network system of claim 19, further comprising:
determining the corresponding state using a mapping scheme.

21. The network system of claim 20, wherein the mapping scheme uses a universal resource locator to identify each of the plurality of states and each of the plurality of transitions.

22. The network system of claim 17, the application specification comprising an application usage specification and a business object specification.

23. A network system, having a client and a server running an enterprise application comprising:
a web crawler operatively connected to the server; and
a code analyzer operatively connected to the server,
wherein the web crawler obtains information about the enterprise application to obtain a plurality of states and a plurality of transitions, and the code analyzer parses and analyzes source code of the enterprise application to obtain a list of variables and process logic for each of the plurality of transitions.

24. The network system of claim 23, further comprising:
an integration means for combining each of the plurality of states, the plurality of transitions, the list of variables for each of the plurality of states, the process logic for each of a plurality of transitions to produce an application specification.

25. The network system of claim 24, wherein the integration means formats the application specification into an extensible mark-up language compliant file.

26. The network system of claim 24, the application specification comprising grouping each of the plurality of transitions with a corresponding state in the plurality of states.

27. The network system of claim 26, further comprising:
determining the corresponding state using a mapping scheme.

28. The network system of claim 27, wherein the mapping scheme uses a universal resource locator to identify each of the plurality of states and each of the plurality of transitions.

29. The network system of claim 24, the application specification comprising an application usage specification and a business object specification.

30. An apparatus for deriving an application specification from an enterprise application comprising:
means for obtaining information about a plurality of states and a plurality of transitions in the enterprise application;
means for monitoring the enterprise application to obtain a list of variables for each of the plurality of states;
means for parsing source code of the enterprise application to obtain process logic for each of the plurality of transitions; and
means for deriving the application specification using each of the plurality of states, the plurality of transitions, the list of variable usages for each of the plurality of states, and the process logic for each of a plurality of transitions.

* * * * *